O. HAJEK.
LUBRICATOR.
APPLICATION FILED JULY 26, 1909.

963,547.

Patented July 5, 1910.
2 SHEETS—SHEET 1.

O. HAJEK.
LUBRICATOR.
APPLICATION FILED JULY 26, 1909.

963,547.

Patented July 5, 1910.
2 SHEETS—SHEET 2.

Witnesses:
Robert Everitt
C. D. Kesler

Inventor
Otto Hajek
By
James L. Norris
Atty.

UNITED STATES PATENT OFFICE.

OTTO HAJEK, OF VIENNA, AUSTRIA-HUNGARY, ASSIGNOR TO THE FIRM OF ALEX. FRIEDMANN, OF VIENNA, AUSTRIA-HUNGARY.

LUBRICATOR.

963,547.   Specification of Letters Patent.   Patented July 5, 1910.

Application filed July 26, 1909. Serial No. 509,629.

*To all whom it may concern:*

Be it known that I, OTTO HAJEK, a subject of the Emperor of Austria-Hungary, residing at Vienna, Austria-Hungary, have invented certain new and useful Improvements in Lubricators, of which the following is a specification.

The present invention relates to a lubricator having a plurality of pumps adapted to be connected to a common oil reservoir and embodying a sight glass which is filled from the reservoir to normally indicate the level of oil therein in conjunction with means whereby communication may be established between the sight glass and any one of said pumps in order to indicate the rate of feed thereof.

The essential feature of the invention involves the provision of means whereby each separate pump can be brought into communication with a sight glass which is at the same time cut off from the oil reservoir, so that the oil in the sight glass flows to the pump which is connected to the sight glass. During such connection between the sight glass and pump, the oil in the sight glass will sink or fall at a rate depending upon the amount of oil discharged by the particular pump connected to the sight glass, thereby affording means for indicating whether the particular pump connected with the sight glass is in proper working condition and the rate of feed of such pump.

Figure 1:
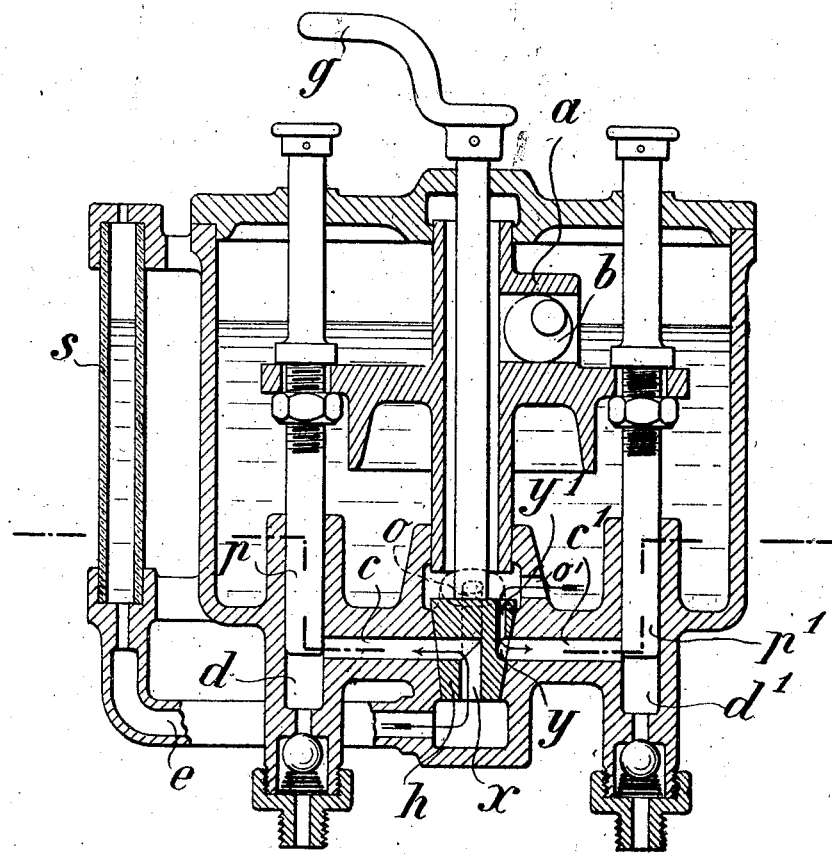
Figure 2:
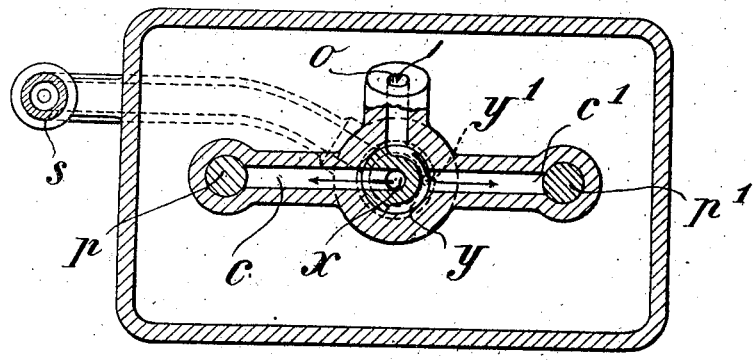
Figure 3:
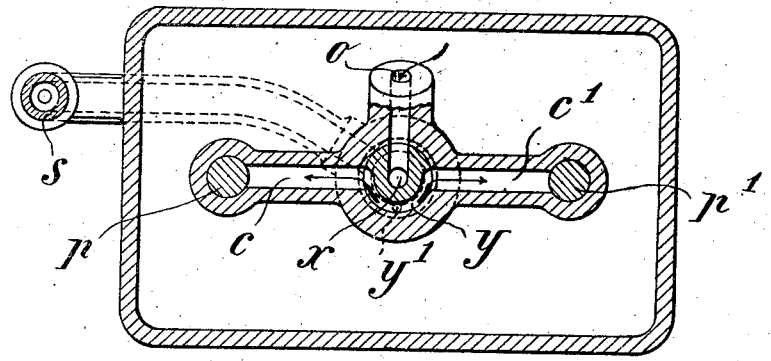

In the accompanying drawing: Figure 1 represents a vertical section through one form of lubricator wherein two oil pumps are arranged in the oil reservoir; Figs. 2 and 3 represent horizontal cross sections through the lower portion of the lubricator and show the action of the controlling valve in the different positions which it is adapted to occupy.

The pump pistons $p$ and $p'$ may be actuated in any suitable way, an eccentric $b$ being provided for that purpose in the present instance having a two-armed sleeve $a$. Ducts $c$ and $c'$ formed in the lubricator casing provide means for the passage of oil to the pump cylinders $d$ and $d'$ from which cylinders the oil is fed to the pressure feed pipes. A sight glass $s$ is arranged on the exterior of the oil reservoir and is capable of being connected with the oil reservoir through the pipes $e$ and $o$, the sight glass being arranged preferably upon the same level as the oil reservoir in order that the height of the column of oil in the sight glass may normally indicate the level of oil within the reservoir.

All of the ducts leading from the oil reservoir to the pumps and to the sight glass pass through a controlling valve $h$ which in the present instance is in the form of a conical cock. However, the invention is not limited to a controlling valve of the specific form shown as an equivalent device may be employed. It will also be understood that the invention is not limited to the use of pumps of the specific form shown, as pumps of different kinds may be used if found suitable.

The controlling valve $h$ is provided with a duct $x$ which according to its position, which may be changed by the handle $g$, is capable of bringing the channel or pipe $e$ and consequently the sight glass, into connection either with the oil reservoir as shown in Fig. 3 or with one pump cylinder through the oil feed ducts as shown in Figs. 1 and 2. Furthermore, a channel $y$ is formed in the controlling valve which is connected by the branch $y'$ with the oil reservoir through the opening $o'$. This channel $y$ is capable of connecting the oil reservoir with the cylinder of either pump. If the controlling valve $h$ is so rotated that it assumes the position shown in Figs. 1 and 2, the piston cylinder $d$ is connected with the oil sight glass $s$ through the channels $c$, $x$ and the channel or pipe $e$ while at the same time the cylinder $d$ and the oil sight glass have no communication with the oil reservoir or the channel $o$ leading thereto. The cylinder $d'$ of the other pump is in this position connected to the oil reservoir through the channels $c'$, $y$, $y'$, and $o'$. Therefore, with the parts occupying the position shown in Figs. 1 and 2, the pump $p$ receives its oil solely from the sight glass $s$, while the other pump $p'$ receives oil solely from the oil reservoir.

The position of the controlling valve shown in Fig. 3 brings the oil reservoir into connection with the pipe or channel $e$ and the sight glass $s$ through the channel $x$ which therefore indicates the height of oil in the oil reservoir. At the same time both pumps are connected with the oil reservoir through the channels $y$ and $y'$ and, therefore, both pumps receive oil directly from the oil reservoir, and upon the descent of the pistons the oil contained in that part of the cylinders $d$ and $d'$ below the channels $c$ and $c'$ will be compressed and forced through suitable valves to the mechanism to be lubricated.

Under normal conditions, the oil pumps in the oil reservoir both receive oil from the oil reservoir while the glass $s$ acts only as a sight glass. When, however, it is desirable to determine whether and to what degree any one oil pump is operating, it is only necessary to turn the controlling valve by means of its handle so that such handle occupies a position above one pump piston, a portion of which projects from the lid of the oil vessel. When the handle occupies such a position, the sight glass is cut off from the oil reservoir and is connected with the particular pump under test. The height of the column of oil in the sight glass will fall according to the rate of feed of the particular pump to which the sight glass is then connected. Normally, however, as stated, the pumps receive oil directly from the common reservoir through the passages $o$ and $c'$, the semi-circular channel $y$ in the ported valve, the passage $y'$ in the valve and the passage $o'$ communicating with the reservoir, the sight glass $s$ at this time being in communication with the reservoir through the pipe or passage $e$, the central port $x$ of the valve and the passage or channel $o$ leading from the reservoir, and when the sight glass is so connected, it serves as an indicator to show the amount of oil contained in the reservoir.

Claim:

1. In a lubricator, the combination of an oil reservoir, a pump having a channel leading thereto, a sight tube disposed on approximately the level of the reservoir and having a channel communicating therewith, and a valve having a duct for establishing communication between the sight tube and the reservoir to charge the said tube with oil when the valve occupies one position and for establishing communication between the sight tube and the pump when the valve occupies another position whereby the pump may withdraw oil from the sight tube.

2. In a lubricator, the combination of an oil reservoir, a pump, a sight tube arranged approximately on the same level with the reservoir and having means for establishing communication therewith, and a valve capable of being set in one position to establish communication between the reservoir and the sight tube and capable of being set in a different position to establish communication between the sight tube and the pump.

3. In a lubricator, the combination of an oil reservoir, a pump, a sight tube capable of receiving a charge of oil from the reservoir, and a device capable of being set in one position to establish communication between the reservoir and both the pump and the sight tube and capable of being set in a different position to establish communication between the sight tube and the pump.

4. In a lubricator, the combination of an oil reservoir, a plurality of pumps, a sight tube capable of receiving a charge of oil from the reservoir, and a device capable of being set in one position to establish communication between the sight tube and one of said pumps and between the said reservoir and another of said pumps.

5. In a lubricator, the combination of an oil reservoir, a plurality of pumps, a sight tube capable of receiving a charge of oil from the reservoir, and a device capable of being set in one position to establish communication between said sight tube and either one of said pumps and maintaining communication between the reservoir and another of said pumps and capable of occupying a different position to establish communication between the reservoir and the pumps and between the reservoir and the sight tube.

In testimony whereof I have hereunto set my hand in presence of two subscribing witnesses.

OTTO HAJEK.

Witnesses:
 JOSEF RUBORCH,
 AUGUST FUZZER.